US011091248B2

(12) United States Patent
Tsai (10) Patent No.: US 11,091,248 B2
(45) Date of Patent: Aug. 17, 2021

(54) FLAP ACTUATOR MECHANISM (71) Applicant: THE BOEING COMPANY, Chicago, IL (US)

(72) Inventor: Kevin R. Tsai, Seattle, WA (US)

(73) Assignee: THE BOEING COMPANY, Chicago, IL (US)

(*) Notice: Subject to any disclaimer, the term of this patent is extended or adjusted under 35 U.S.C. 154(b) by 234 days.

(21) Appl. No.: 16/573,417

(22) Filed: Sep. 17, 2019

(65) Prior Publication Data
US 2021/0078694 A1 Mar. 18, 2021

(51) Int. Cl.
B64C 13/28 (2006.01)
B64C 3/28 (2006.01)
B64C 9/04 (2006.01)

(52) U.S. Cl.
CPC ............... B64C 13/28 (2013.01); B64C 3/28 (2013.01); B64C 9/04 (2013.01)

(58) Field of Classification Search
CPC ........... B64C 13/00; B64C 13/28; B64C 3/28; B64C 9/04
See application file for complete search history.

(56) References Cited

U.S. PATENT DOCUMENTS

| 4,381,093 | A | * | 4/1983 | Rudolph | B64C 9/16 244/216 |
| 4,605,187 | A | * | 8/1986 | Stephenson | B64C 9/18 244/216 |
| 4,995,575 | A | * | 2/1991 | Stephenson | B64C 9/16 244/216 |
| 5,094,412 | A | | 3/1992 | Narramore | |
| 5,098,043 | A | | 3/1992 | Arena | |
| 7,293,744 | B2 | * | 11/2007 | Perez-Sanchez | B64C 9/22 244/211 |
| 7,520,471 | B2 | | 4/2009 | Daniel et al. | |
| 7,600,718 | B2 | * | 10/2009 | Perez-Sanchez | B64C 9/18 244/215 |
| 7,861,978 | B2 | | 1/2011 | Ben | |
| 8,302,913 | B2 | * | 11/2012 | Schlipf | B64C 9/16 244/215 |
| 8,684,316 | B2 | * | 4/2014 | Sakurai | B64C 9/16 244/216 |
| 8,746,625 | B2 | * | 6/2014 | Recksiek | B64C 9/16 244/215 |
| 8,844,878 | B2 | * | 9/2014 | Voss | B64C 9/28 244/216 |

(Continued)

Primary Examiner — Justin M Benedik
(74) Attorney, Agent, or Firm — Armstrong Teasdale LLP (57) ABSTRACT An actuator mechanism for a flap includes a first link having a rotary-driven end and a free end, and a second link having a forward end, a mid-portion, and an aft end. The rotary-driven end is pivotally connected to a base structure, the forward end is pivotally connected to the free end, and the aft end is connected to the flap. The actuator mechanism also includes a third link that includes a fixed end, an intermediate connector, and an end connector. The fixed end is pivotally connected to the base structure, and the intermediate connector is pivotally connected to the mid-portion of the second link. The actuator mechanism further includes a flap link including a first end pivotally connected to the end connector, and a second end pivotally connected to the flap. Rotation of the first link causes the flap to transition from a stowed to a fully deployed position.

20 Claims, 5 Drawing Sheets (56) References Cited

U.S. PATENT DOCUMENTS

| 9,688,385 B2 | 6/2017 | Surya et al. |
| 2007/0102589 A1* | 5/2007 | Holert ........................ B64C 9/16 244/215 |
| 2007/0176051 A1 | 8/2007 | Good et al. |

* cited by examiner

FLAP ACTUATOR MECHANISM

FIELD

The field of the disclosure relates generally to flap actuator mechanisms and, more specifically, to a system for actuating a flap that reduces mechanical interference in a space between a base structure and the flap.

BACKGROUND

Many structures, such as aircraft, include horizontal control surfaces, or "flaps," that are movable by an actuator mechanism to adjust an aero- or hydro-dynamic profile of the structure for various operating conditions. A relatively wide, deep, and long fairing is typically required to accommodate actuator mechanisms for such flaps. However, the relatively wide fairing tends to reduce an overall aero- or hydro-dynamic efficiency of the structure, reducing a benefit of the flap. Additionally, as the flap is deployed, the actuator mechanism typically protrudes into the region that was occupied by the flap in a stowed position, creating a potential for interference with other systems housed by the fairing. For example, some aircraft wings include droop spoilers that are movable, as the flap is deployed, into the region formerly occupied by the stowed flap to reduce flow into the gap between the aft portion of the wing and the deployed flap. Accordingly, a flap actuator mechanism that accommodates a more shallow fairing, and/or that operates without reduced protrusion into the space between the deployed flap and the base structure (e.g., wing), would find utility.

BRIEF DESCRIPTION

One aspect of the present disclosure includes an actuator mechanism for a flap. The actuator mechanism includes a first link having a rotary-driven end and a free end. The rotary-driven end is pivotally connected to a base structure at a fixed axis. The actuator mechanism also includes a second link having a forward end, a mid-portion, and an aft end. The forward end is pivotally connected to the free end of the first link, and the aft end is connected to an underside of the flap. The underside of the flap in a stowed position defines an initial underside profile. The actuator mechanism further includes a third link that includes a fixed end, an intermediate connector, and an end connector. The fixed end is pivotally connected to the base structure, and the intermediate connector is pivotally connected to the mid-portion of the second link. In addition, the actuator mechanism includes a flap link having a first end and a second end. The first end is pivotally connected to the end connector of the third link, and the second end is pivotally connected to the underside of the flap. Rotation of the first link in a first direction causes the flap to transition from the stowed position to a fully deployed position, and the flap link remains below the initial underside profile of the flap during the transition.

Another aspect of the present disclosure includes an actuator mechanism for moving a flap between a stowed position and a fully deployed position. The actuator mechanism includes a first link having a rotary-driven end and a free end. The rotary-driven end is pivotally connected to a base structure at a fixed axis. The actuator mechanism also includes a second link having a forward end, a mid-portion, and an aft end. The forward end is pivotally connected to the free end of the first link, and the aft end is connected to the flap. The actuator mechanism further includes a third link that includes a fixed end, an intermediate connector, and an end connector. The fixed end is pivotally connected to the base structure, and the intermediate connector is pivotally connected to the mid-portion of the second link. In addition, the actuator mechanism includes a flap link having a first end and a second end. The first end is pivotally connected to the end connector of the third link, and the second end is pivotally connected to the flap. Rotation of the first link in a first direction causes the flap to transition from the stowed position to the fully deployed position. The second link, the third link, and the flap link do not pass through an initial flap region during the transition. The initial flap region is a volume occupied by the flap in the stowed position.

Another aspect of the present disclosure includes aircraft that includes a wing including a base structure, a flap, an actuator mechanism, and a droop spoiler. The actuator mechanism connects the flap to the base structure and is operable to transition the flap between a stowed position and a fully deployed position. An initial flap region is defined by a volume occupied by the flap in the stowed position. The droop spoiler has from a base end and a spoiler end. The base end is pivotally mounted to the base structure, and the spoiler end is positioned above the flap in the stowed position and rotatable down into the initial flap region during the transition. The actuator mechanism includes a first link having a rotary-driven end and a free end. The rotary-driven end is pivotally connected to a base structure at a fixed axis. The actuator mechanism also includes a second link having a forward end, a mid-portion, and an aft end. The forward end is pivotally connected to the free end of the first link, and the aft end is connected to the flap. The actuator mechanism further includes a third link that includes a fixed end, an intermediate connector, and an end connector. The fixed end is pivotally connected to the base structure, and the intermediate connector is pivotally connected to the mid-portion of the second link. In addition, the actuator mechanism includes a flap link having a first end and a second end. The first end is pivotally connected to the end connector of the third link, and the second end is pivotally connected to the flap. Rotation of the first link in a first direction causes the flap to transition from the stowed position to the fully deployed position. The actuator mechanism does not interfere with the droop spoiler during the transition.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

Although specific features of various examples may be shown in some drawings and not in others, this is for convenience only. Any feature of any drawing may be referenced and/or claimed in combination with any feature of any other drawing.

Unless otherwise indicated, the drawings provided herein are meant to illustrate features of examples of the disclosure. These features are believed to be applicable in a wide variety of systems comprising one or more examples of the disclosure. As such, the drawings are not meant to include all conventional features known by those of ordinary skill in the art to be required for the practice of the examples disclosed herein.

DETAILED DESCRIPTION

Examples of the systems and methods described herein include an actuator mechanism for a flap. The actuator mechanism includes a first link, a second link, a third link, and a flap link interconnected such that rotation of the first link in a first direction causes the flap to transition from a stowed position to a fully deployed position. The transition from the stowed position to the fully deployed position is accomplished with reduced or eliminated protrusion of the elements of the actuator mechanism into a region initially occupied by the flap. Accordingly, the actuator mechanism reduces or eliminates interfere with other systems that may operate in the same region during deployment of the flap, such as a droop spoiler. In some examples, the actuator mechanism attaches to a bracket mounted on the underside of the flap, which preserves a structural integrity of the flap and/or provides a more efficient load path from the flap through the actuator mechanism.

Figure 1:
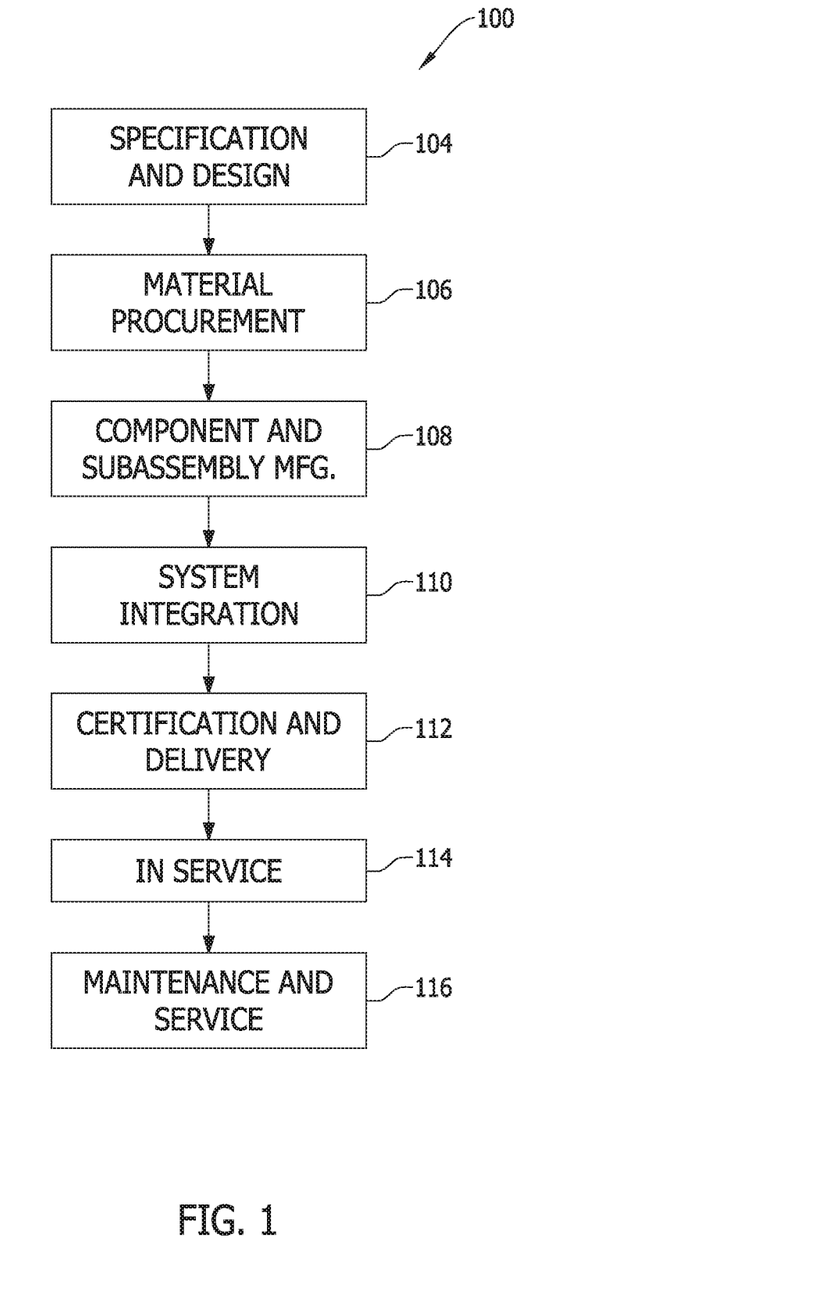
FIG. 1 is a flow diagram of an example aircraft production and service methodology.
Figure 2:
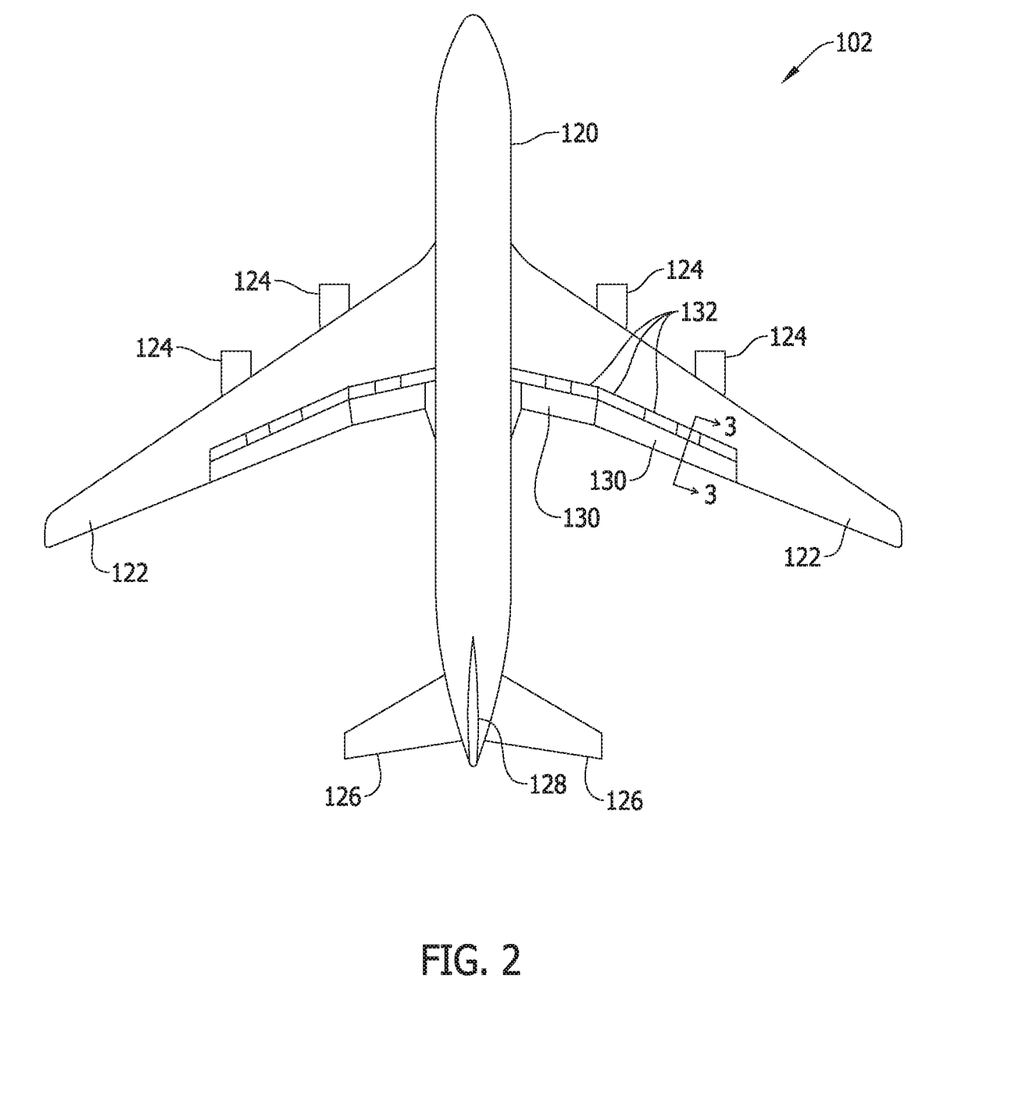
FIG. 2 is a schematic diagram of an aircraft.

Referring more particularly to the drawings, implementations of the disclosure may be described in the context of a method 100 for aircraft manufacturing and service, as shown in FIG. 1, and an aircraft 102, as shown in FIG. 2. During pre-production, method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, the aircraft 102 produced by method 100 may include a fuselage 120, wings 122, engines 124, horizontal stabilizers 126, a vertical stabilizer 128, and any number of additional internal and external systems (not shown). In addition, aircraft 102 includes flaps 130 mounted on an aft side of each wing 122. A position of flaps 130 relative to wing 122 is variable to alter or control an aerodynamic profile of wing 122. Alternatively, flaps 130 may be mounted at any suitable location on aircraft 102. Also in the example, aircraft 102 includes droop spoilers 132 mounted on a top surface of each wing 122. Droop spoilers 132 extend aftward from wing 122 toward flaps 130. A position of droop spoilers 132 is also variable to alter or control an aerodynamic profile of wing 122. Although an aerospace example is shown, the principles of the disclosure may be applied to other industries, such as sea or land vehicles.

Apparatuses and methods implemented herein may be employed during any one or more of the stages of method 100. For example, components or subassemblies corresponding to component and subassembly manufacturing 108 may be fabricated or manufactured in a manner similar to components or subassemblies produced while the aircraft 102 is in service. Also, one or more apparatus implementations, method implementations, or a combination thereof may be utilized during the production stages 108 and 110, for example, by substantially expediting assembly of or reducing the cost of an aircraft 102. Similarly, one or more of apparatus implementations, method implementations, or a combination thereof may be utilized while the aircraft 102 is in service, for example and without limitation, to maintenance and service 116. In some examples, one or more of apparatus implementations, method implementations, or a combination thereof may be utilized during maintenance and service 116 as a retrofit to aircraft 102.

Figure 3:
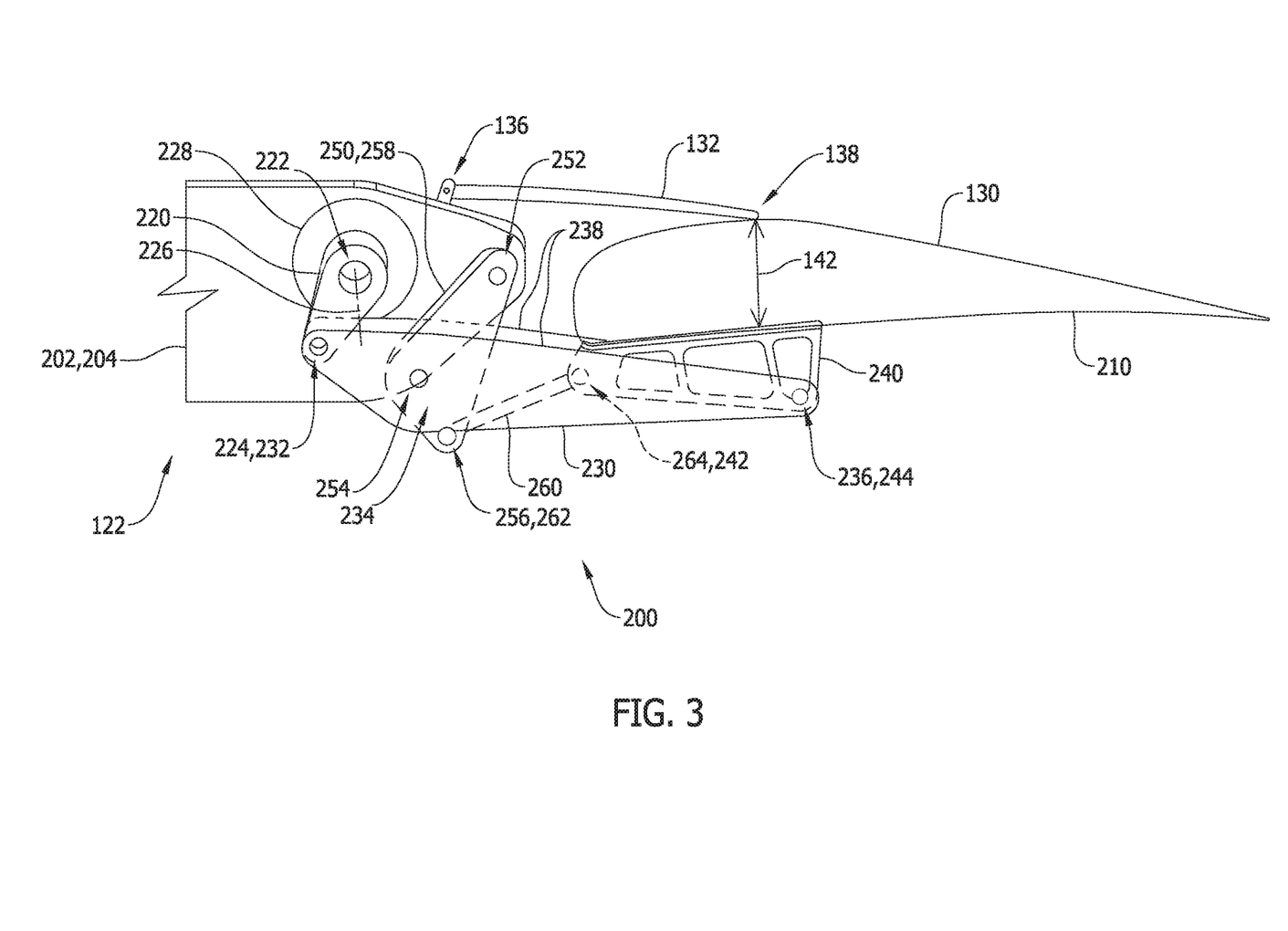
FIG. 3 is a schematic cutaway view taken along lines 3-3 of FIG. 2, showing an aft portion of a wing of the aircraft with a horizontal flap in a fully stowed position.
Figure 4:
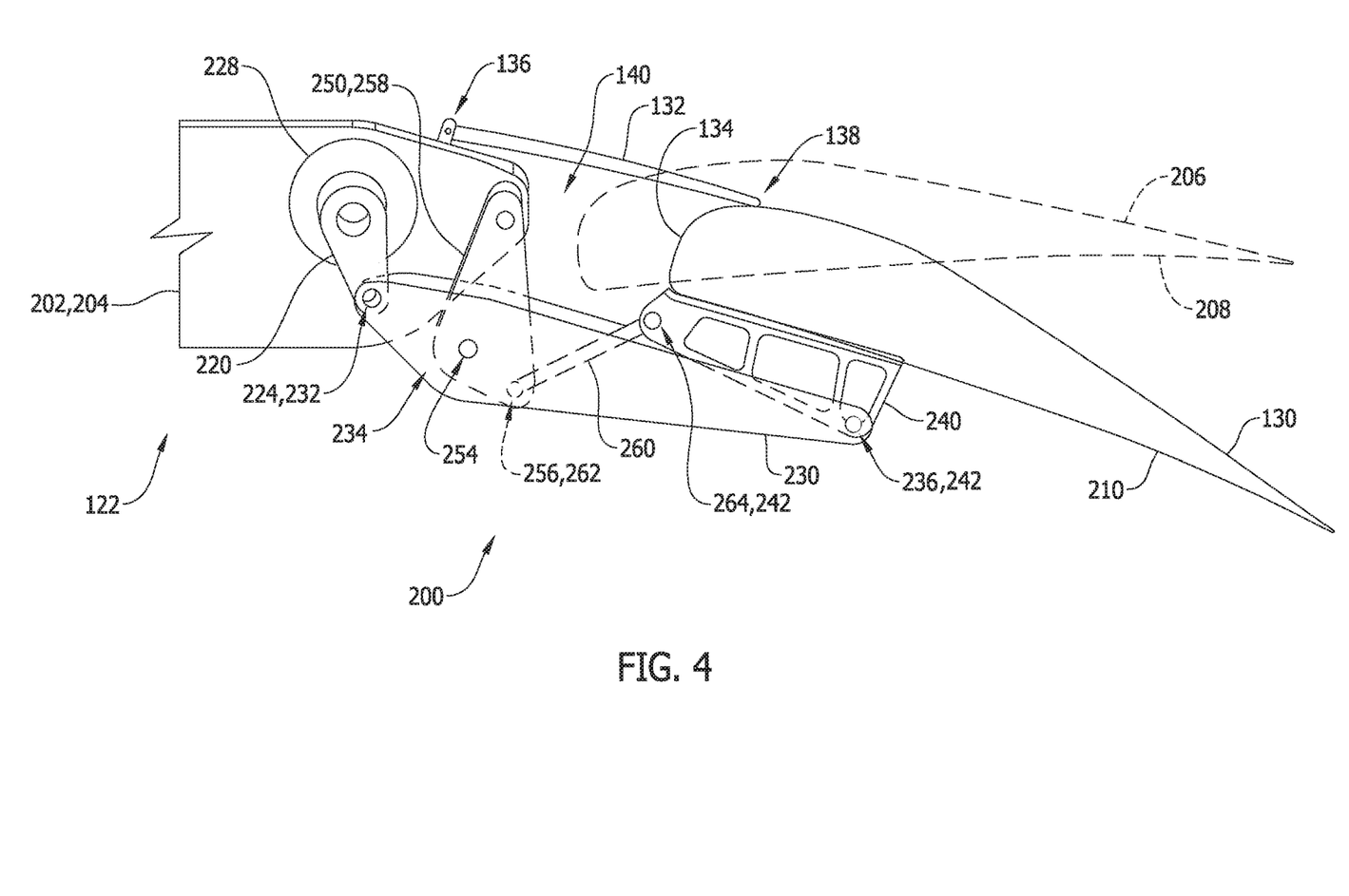
FIG. 4 is a schematic cutaway view of the aft portion of the wing shown in FIG. 3, showing the flap in a partially deployed position.
Figure 5:
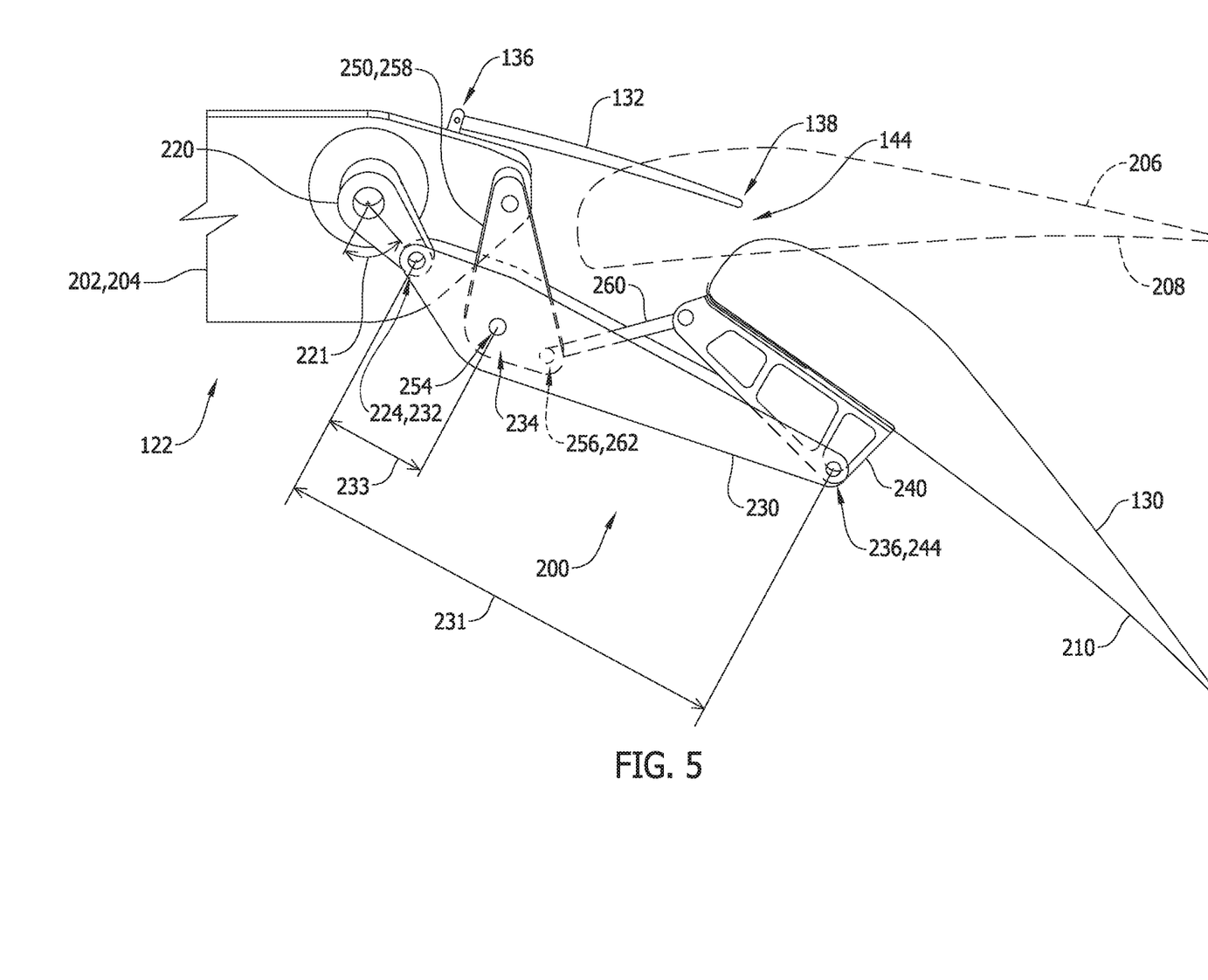
FIG. 5 is a schematic cutaway view of the aft portion of the wing shown in FIG. 3, showing the flap in a fully deployed position.

FIG. 3 is a schematic cutaway view taken along lines 3-3 of FIG. 1, showing an aft portion of wing 122 and one of flaps 130 in a fully retracted position. FIG. 4 is a schematic cutaway view of the aft portion of wing 122 shown in FIG. 3, showing the flap 130 in a partially deployed position. FIG. 5 is a schematic cutaway view of the aft portion of wing 122 shown in FIG. 3, showing the flap 130 in a fully deployed position.

With reference to FIGS. 3-5, flap 130 is connected to a base structure 202 by an actuator mechanism 200. Base structure 202 is embodied in the illustrated example as a rib 204 of wing 122. In other examples, base structure 202 may be another suitable portion of wing 122, another portion of aircraft 102 (shown in FIG. 1), or any structure adapted for connection to a flap. Actuator mechanism 200 is operable to transition flap 130 between a stowed position, shown in FIG. 3, and a fully deployed position, shown in FIG. 5. An initial flap region 206 (shown in dashed lines in FIGS. 4 and 5) is defined by a volume occupied by flap 130 in the stowed position. In addition, when flap 130 is in the stowed position, an underside 210 of flap 130 defines an initial underside profile 208 (shown in dashed lines in FIGS. 4 and 5). Initial underside profile 208 forms a lower boundary of initial flap region 206.

Actuator mechanism 200 includes a first link 220 having a rotary-driven end 222 and a free end 224. In the example, first link 220 is implemented as a flat bar that tapers from rotary-driven end 222 towards free end 224. Alternatively, first link 220 is implemented in any suitable fashion that enables actuator mechanism 200 to function as described herein.

Rotary-driven end 222 is pivotally connected to base structure 202 at a fixed axis 226. Rotation of rotary-driven end 222 causes first link 220 to rotate about fixed axis 226. Moreover, rotation of first link 220 about fixed axis 226 in a first direction, counterclockwise in the view of FIGS. 3-5, causes flap 130 to transition from the stowed position to the fully deployed position. Similarly, rotation of first link 220 about fixed axis 226 in an opposite second direction, clockwise in the view of FIGS. 3-5, causes flap 130 to transition back from the fully deployed position to the stowed position. In the example, actuator mechanism 200 is powered by a suitably controlled rotary actuator 228 mounted on base structure 202 and drivingly connected to rotary-driven end 222. Alternatively, actuator mechanism 200 is powered in any suitable fashion that enables actuator mechanism 200 to function as described herein.

Actuator mechanism 200 also includes a second link 230 having a forward end 232, a mid-portion 234, and an aft end 236. Forward end 232 is pivotally connected to free end 224 of first link 220. In the example, second link 230 is implemented as a pair of plates 238. Plates 238 are spaced apart and oriented generally parallel to each other. Free end 224 of first link 220 extends between, and is pivotally connected between, plates 238, for example by a pin connection. Alternatively, second link 230 is implemented in any suitable fashion, and/or forward end 232 is pivotally connected to free end 224 of first link 220 in any suitable fashion, that enables actuator mechanism 200 to function as described herein.

Aft end 236 of second link 230 is connected to flap 130. In some examples, aft end 236 is indirectly connected to flap 130. For example, a bracket 240 is fixedly mounted to underside 210 of flap 130, and aft end 236 of second link 230 is connected to underside 210 of flap 130 via bracket 240. More specifically, aft end 236 is pivotally connected to an aft connector 244 of bracket 240, for example by a pin connection. In certain examples, indirect connection of aft end 236 of second link 230 to flap 130, such as via bracket 240 fixedly mounted to underside 210, facilitates a structural integrity of flap 130 as compared to known methods of connecting flap actuators to flaps. For example, indirect connection of aft end 236 of second link 230 to flap 130, such as via bracket 240, avoids routing aft end 236 through underside 210 of flap 130 into a pin connection (not shown) in an interior of flap 130. Additionally or alternatively, connection of aft end 236 of second link 230 to underside 210 of flap 130 via bracket 240 enables a more shallow fairing depth 142, as compared to known actuator mechanisms. Alternatively, aft end 236 of second link 230 is connected to flap 130 in any suitable fashion that enables actuator mechanism 200 to function as described herein.

Actuator mechanism 200 further includes a third link 250 and a flap link 260. Third link 250 includes a fixed end 252, an intermediate connector 254, and an end connector 256. Fixed end 252 is pivotally connected to base structure 202, for example by a pin connector, and intermediate connector 254 is pivotally connected to mid-portion 234 of second link 230.

Flap link 260 has a first end 262 and a second end 264. First end 262 is pivotally connected to end connector 256 of third link 250, for example by a pin connection, and second end 264 is pivotally connected to underside 210 of flap 130.

In certain examples, other operational systems are associated with base structure 202 and may extend into initial flap region 206 during transition of flap 130 between the stowed position and the fully deployed position. For example, in the illustrated example, base structure 202 is rib 204 of wing 122, and wing 122 also includes droop spoiler 132. Droop spoiler 132 has a base end 136 and a spoiler end 138. Base end 136 is pivotally mounted to base structure 202, for example by a rotary-driven connection. Spoiler end 138 is positioned above flap 130 in the stowed position (shown in FIG. 3), and is rotatable down into initial flap region 206 during the transition of flap 130 from the stowed position to the fully deployed position (shown in FIGS. 4 and 5). Alternatively, any other suitable operational systems associated with base structure 202, or no systems, may extend into initial flap region 206 during transition of flap 130 between the stowed position and the fully deployed position.

In some examples, second link 230, third link 250, and flap link 260 are interconnected such that flap link 260 remains below initial underside profile 208 of flap 130 during the transition of flap 130 from the stowed position to the fully deployed position. In some such examples, maintaining flap link 260 below initial underside profile 208 during the transition reduces a potential for interference between actuator mechanism 200 and other operational systems associated with base structure 202, such as droop spoiler 132 of wing 122 in the illustrated example.

In certain examples, intermediate connector 254 of third link 250 is connected to mid-portion 234 of second link 230 at a distance 233 from forward end 232 that is less than 35 percent of a length 231 from forward end 232 to aft end 236 of second link 230. In some such examples, this range for distance 233 of the connection of intermediate connector 254 to mid-portion 234 along length 231 facilitates preventing third link 250 from rotating into initial flap region 206 as actuator mechanism 200 transitions flap 130 from the stowed position to the fully deployed position, reducing a potential for interference between actuator mechanism 200 and other operational systems associated with base structure 202, such as droop spoiler 132 of wing 122 in the illustrated example. In the illustrated example, a particular advantage as described above is obtained by intermediate connector 254 connected to mid-portion 234 at distance 233 between 20 and 25 percent of length 231 from forward end 232 to aft end 236 of second link 230. Alternatively, intermediate connector 254 of third link 250 is connected to mid-portion 234 of second link 230 at any suitable distance along length 231 that enables actuator mechanism 200 to function as described herein.

In some examples, first link 220, second link 230, third link 250, and flap link 260 are interconnected such that a rotational stroke 221, or amount of rotation, of first link 220 of less than 90 degrees about fixed axis 226 transitions flap 130 from the stowed position (shown in FIG. 3) to the fully deployed position (shown in FIG. 5). In some such examples, this stroke range for the transition of flap 130 between the stowed and fully deployed positions facilitates preventing third link 250 from rotating into initial flap region 206 as actuator mechanism 200 transitions flap 130 from the stowed position to the fully deployed position, reducing a potential for interference between actuator mechanism 200 and other operational systems associated with base structure 202, such as droop spoiler 132 of wing 122 in the illustrated example. Additionally or alternatively, this stroke range enables an increased mechanical advantage of first link 220, as compared to known actuator mechanisms that require longer stroke ranges. In the illustrated example, a particular advantage as described above is obtained by rotational stroke 221 in a range of about 70 to 75 degrees. Alternatively, rotational stroke 221 to transition flap 130 from the stowed position to the fully deployed position is any suitable value that enables actuator mechanism 200 to function as described herein.

In certain examples, the advantages associated with maintaining flap link 260 below initial underside profile 208 and/or maintaining second link 230, third link 250, and flap link 260 outside initial flap region 206, as described above, are particularly realized when flap 130 is positioned as shown in FIG. 4 for a takeoff condition of aircraft 102. More specifically, actuator mechanism 200 enables rotation of droop spoiler 132 into initial flap region 206 such that spoiler end 138 contacts a surface of flap 130, reducing air flow into a gap 140 between an aft portion of base structure 202 and leading edge 134 of flap 130, in a configuration that decreases an aerodynamic drag associated with deployment of flap 130 for takeoff. In contrast, conventional actuator mechanisms (not shown) are unable to achieve an aerodynamic advantage by positioning spoiler end 138 to contact flap 130 during takeoff. Alternatively, droop spoiler 132 is positioned in any suitable fashion for a takeoff condition.

In some examples, the advantages associated with maintaining flap link 260 below initial underside profile 208 and/or maintaining second link 230, third link 250, and flap link 260 outside initial flap region 206, as described above, are particularly realized when flap 130 is positioned as shown in FIG. 5 for a landing condition of aircraft 102. More specifically, actuator mechanism 200 enables rotation of droop spoiler 132 into initial flap region 206 such that a preselected separation distance 144 is maintained between spoiler end 138 and flap 130 fully deployed for landing. Separation distance 144 is selected to facilitate an air flow between spoiler end 138 and flap 130 that re-attaches to an upper surface of flap 130 and prevents stall. With the flap link 260 coupled to an underside of the flap 130 (to a fore end of a flap bracket 240), during movement of flap 130 to a deployed position as shown in FIG. 5, the flap link 260 remains below the underside of the flap 130 and does not protrude into the gap 140 between the aft portion of base structure 202 and leading edge 134 of flap 130, to thereby prohibit any flap link interference with downward operation of droop spoiler 132. In contrast, conventional actuator mechanisms (not shown) limit an ability to control separation distance 144 between spoiler end 138 and flap 130 during landing. Alternatively, droop spoiler 132 is positioned in any suitable fashion for a landing condition.

In some examples, second end 264 of flap link 260 is indirectly connected to flap 130. For example, second end 264 of flap link 260 is connected to underside 210 of flap 130 via bracket 240, described above. More specifically, second end 264 is pivotally connected to a forward connector 242 of bracket 240, for example by a pin connection. In certain examples, indirect connection of second end 264 of flap link 260 to flap 130, such as via bracket 240 fixedly mounted to underside 210, facilitates a structural integrity of flap 130 as compared to known methods of connecting flap actuators to flaps. For example, indirect connection of second end 264 to flap 130, such as via bracket 240, avoids a connection and structural load path through a leading edge 134 of flap 130 into an interior of flap 130. Additionally or alternatively, connection of aft end 236 of second link 230 to underside 210 of flap 130 via bracket 240 enables more shallow fairing depth 142 as compared to known actuator mechanisms, as described above. Alternatively, second end 264 of flap link 260 is connected to flap 130 in any suitable fashion that enables actuator mechanism 200 to function as described herein.

In the example, third link 250 is implemented as a bellcrank 258, with a portion between fixed end 252 and intermediate connector 254 defining a first arm of bellcrank 258 and another portion between intermediate connector 254 and end connector 256 defining a second arm of bellcrank 258. Alternatively, third link 250 is implemented in any suitable fashion that enables actuator mechanism 200 to function as described herein.

As described above, in the example, second link 230 is implemented as pair of plates 238. Third link 250 extends between plates 238, and intermediate connector 254 is pivotally connected between plates 238 along mid-portion 234, for example by a pin connection. Alternatively, second link 230 is implemented in any suitable fashion, and/or intermediate connector 254 is pivotally connected along mid-portion 234 in any suitable fashion, that enables actuator mechanism 200 to function as described herein.

Further in the example, flap link 260 is implemented as a bar. Alternatively, flap link 260 is implemented in any suitable fashion that enables actuator mechanism 200 to function as described herein. As described above, in the example, second link 230 is implemented as pair of plates 238. Flap link 260 extends between plates 238, and the pivotal connection between first end 262 and end connector 256 of third link 250 moves between plates 238 as actuator mechanism 200 transitions flap 130 between the stowed position and the fully deployed position. Similarly, the pivotal connection between second end 264 and forward connector 242 of bracket 240 moves between plates 238 as actuator mechanism 200 transitions flap 130 between the stowed position and the fully deployed position. Alternatively, second link 230 is implemented in any suitable fashion, and/or the respective pivotal connections between flap link 260 and third link 250 and bracket 240 move with respect to second link 230 in any suitable fashion, that enables actuator mechanism 200 to function as described herein.

Example technical effects of the methods, systems, and apparatus described herein include at least one of: (a) a deployable flap accommodated in a more shallow fairing, and in some cases a narrower (chord-wise) and shorter (span-wise) fairing; (b) increased structural integrity of a deployable flap; (c) reduced interference of a flap actuator mechanism with other systems, such as a droop spoiler; and (d) increased mechanical advantage of a rotary-driven link for deploying a flap due to a shorter required rotational stroke.

The systems and methods described herein are not limited to the specific examples described herein, but rather, components of the systems and/or steps of the methods may be utilized independently and separately from other components and/or steps described herein. For example, although an example for a flap of an aircraft wing is shown, the principles of the disclosure may be applied to actuated flaps used in other industries, such as sea or land vehicles.

As used herein, an element or step recited in the singular and proceeded with the word "a" or "an" should be understood as not excluding plural elements or steps unless such exclusion is explicitly recited. Furthermore, references to "one example" of the present disclosure, "an example," or "some examples" are not intended to be interpreted as excluding the existence of additional examples that also incorporate the recited features.

This written description uses examples to disclose various examples, which include the best mode, to enable any person skilled in the art to practice those examples, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An actuator mechanism for a flap, the actuator mechanism comprising:

a first link having a rotary-driven end and a free end, the rotary-driven end pivotally connected to a base structure at a fixed axis;

a second link having a forward end, a mid-portion, and an aft end, the forward end pivotally connected to the free end of the first link, and the aft end connected to an underside of the flap, wherein the underside of the flap in a stowed position defines an initial underside profile;

a third link comprising a fixed end, an intermediate connector, and an end connector, the fixed end pivotally connected to the base structure, and the intermediate connector pivotally connected to the mid-portion of the second link; and a flap link having a first end and a second end, the first end pivotally connected to the end connector of the third link and the second end pivotally connected to the underside of the flap, wherein rotation of the first link in a first direction causes the flap to transition from the stowed position to a fully deployed position, and wherein the flap link remains below the initial underside profile of the flap during the transition.

2. The actuator mechanism according to claim 1, further comprising a bracket fixedly mounted to the underside of the flap, wherein the aft end of the second link and the second end of the flap link are connected to the underside of the flap via the bracket.

3. The actuator mechanism according to claim 1, wherein a volume occupied by the flap in the stowed position defines an initial flap region, wherein the flap link does not interfere with a droop spoiler during the transition of the flap from the stowed position to the fully deployed position, the droop spoiler having a base end and a spoiler end, the base end pivotally mounted to the base structure, the spoiler end positioned above the flap in the stowed position and rotatable down into the initial flap region during the transition.

4. The actuator mechanism according to claim 1, wherein a rotational stroke of the first link in the first direction to transition the flap from the stowed position to the fully deployed position is less than 90 degrees.

5. The actuator mechanism according to claim 1, wherein the intermediate connector of the third link is connected to the mid-portion of the second link at a distance from the forward end of the second link that is less than 35 percent along a length from the forward end to the aft end of the second link.

6. The actuator mechanism according to claim 1, wherein the second link comprises a pair of plates, and the free end of the first link is pivotally connected between the pair of plates, the intermediate connector of the third link is pivotally connected between the pair of plates and the flap link extends between the pair of plates.

7. The actuator mechanism according to claim 6, wherein during transition of the flap to the fully deployed position, the flap link remains below the underside of the flap and does not protrude into a gap between an aft portion of the base structure and a leading edge of the flap, thereby prohibiting any interference by the flap link with downward operation of a droop spoiler pivotally connected to the base structure.

8. An actuator mechanism for moving a flap between a stowed position and a fully deployed position, the actuator mechanism comprising:

a first link having a rotary-driven end and a free end, the rotary-driven end pivotally connected to a base structure at a fixed axis;

a second link having a forward end, a mid-portion, and an aft end, the forward end pivotally connected to the free end of the first link, and the aft end connected to the flap;

a third link comprising a fixed end, an intermediate connector, and an end connector, the fixed end pivotally connected to the base structure, and the intermediate connector pivotally connected to the mid-portion of the second link; and a flap link having a first end and a second end, the first end pivotally connected to the end connector of the third link, and the second end pivotally connected to the flap, wherein rotation of the first link in a first direction causes the flap to transition from the stowed position to the fully deployed position, and wherein the second link, the third link, and the flap link do not pass through an initial flap region during the transition, the initial flap region being a volume occupied by the flap in the stowed position.

9. The actuator mechanism according to claim 8, further comprising a bracket fixedly mounted to an underside of the flap, wherein the aft end of the second link and the second end of the flap link are connected to the flap via the bracket.

10. The actuator mechanism according to claim 8, wherein the second link, the third link, and the flap link do not interfere with a droop spoiler during the transition of the flap from the stowed position to the fully deployed position, the droop spoiler having a base end and a spoiler end, the base end pivotally mounted to the base structure, the spoiler end positioned above the flap in the stowed position and rotatable down into the initial flap region during the transition.

11. The actuator mechanism according to claim 8, wherein a rotational stroke of the first link in the first direction to transition the flap from the stowed position to the fully deployed position is less than 90 degrees.

12. The actuator mechanism according to claim 8, wherein the intermediate connector of the third link is connected to the mid-portion of the second link at a distance from the forward end of the second link that is less than 35 percent along a length from the forward end to the aft end of the second link.

13. The actuator mechanism according to claim 8, wherein the second link comprises a pair of plates, and the free end of the first link is pivotally connected between the pair of plates, the intermediate connector of the third link is pivotally connected between the pair of plates and the flap link extends between the pair of plates.

14. The actuator mechanism according to claim 13, wherein during transition of the flap to the fully deployed position, the flap link remains below an underside of the flap and does not protrude into a gap between an aft portion of the base structure and a leading edge of the flap, thereby prohibiting any interference by the flap link with downward operation of a droop spoiler pivotally connected to the base structure.

15. An aircraft comprising: a wing comprising a base structure; a flap;

an actuator mechanism connecting the flap to the base structure and operable to transition the flap between a stowed position and a fully deployed position, wherein an initial flap region is defined by a volume occupied by the flap in the stowed position; and a droop spoiler having a base end and a spoiler end, the base end pivotally mounted to the base structure, the spoiler end positioned above the flap in the stowed position and rotatable down into the initial flap region during the transition, wherein the actuator mechanism comprises:

a first link having a rotary-driven end and a free end, the rotary-driven end pivotally connected to the base structure at a fixed axis, a second link having a forward end, a mid-portion, and an aft end, the forward end pivotally connected to the free end of the first link, and the aft end connected to the flap, a third link comprising a fixed end, an intermediate connector, and an end connector, the fixed end pivotally connected to the base structure, and the intermediate connector pivotally connected to the mid-portion of the second link, and a flap link having a first end and a second end, the first end pivotally connected to the end connector of the third link, and the second end pivotally connected to the flap, and wherein rotation of the first link in a first direction causes the flap to transition from the stowed position to the fully deployed position, and wherein the actuator mechanism does not interfere with the droop spoiler during the transition, and wherein the second link, the third link, and the flap link do not pass through the initial flap region during the transition.

16. The aircraft according to claim 15, further comprising a bracket fixedly mounted to an underside of the flap, wherein the aft end of the second link and the second end of the flap link are pivotally connected to the flap via the bracket.

17. The aircraft according to claim 15, wherein a rotational stroke of the first link in the first direction to transition the flap from the stowed position to the fully deployed position is less than 90 degrees.

18. The aircraft according to claim 15, wherein the intermediate connector of the third link is connected to the mid-portion of the second link at a distance from the forward end of the second link that is less than 35 percent along a length from the forward end to the aft end of the second link.

19. The aircraft according to claim 15, wherein the second link comprises a pair of plates, and the free end of the first link is pivotally connected between the pair of plates, the intermediate connector of the third link is pivotally connected between the pair of plates and the flap link extends between the pair of plates.

20. The aircraft according to claim 19, wherein during transition of the flap to the fully deployed position, the flap link remains below an underside of the flap and does not protrude into a gap between an aft portion of the base structure and a leading edge of the flap, thereby prohibiting any interference by the flap link with downward operation of the droop spoiler.

* * * * *